(12) United States Patent
El Baradai et al.

(10) Patent No.: US 12,046,708 B2
(45) Date of Patent: Jul. 23, 2024

(54) FOLDABLE FLEXIBLE ASSEMBLING OF CELLS FOR A LITHIUM-ION BATTERY AND CURRENT COLLECTOR WITH CARBON BASED CONDUCTIVE MATERIAL

(71) Applicant: CSEM Centre Suisse d'Electronique et de Microtechnique SA—Recherche et Developpement, Neuchatel (CH)

(72) Inventors: Oussama El Baradai, Basel (CH); Alessandro Mustaccio, Pratteln (CH); Soren Fricke, Zofingen (CH); Christian Bosshard, Lausen (CH)

(73) Assignee: RENATA SA, Itingen (CH)

( * ) Notice: Subject to any disclaimer, the term of this patent is extended or adjusted under 35 U.S.C. 154(b) by 586 days.

(21) Appl. No.: 16/760,065

(22) PCT Filed: Nov. 3, 2017

(86) PCT No.: PCT/IB2017/056866
§ 371 (c)(1),
(2) Date: Apr. 29, 2020

(87) PCT Pub. No.: WO2019/086935
PCT Pub. Date: May 9, 2019

(65) Prior Publication Data
US 2020/0358124 A1   Nov. 12, 2020

(51) Int. Cl.
*H01M 10/04* (2006.01)
*H01M 10/0525* (2010.01)
(Continued)

(52) U.S. Cl.
CPC ..... *H01M 10/045* (2013.01); *H01M 10/0459* (2013.01); *H01M 10/0525* (2013.01);
(Continued)

(58) Field of Classification Search
CPC .......... H01M 10/0431; H01M 10/045; H01M 10/0459; H01M 10/0525; H01M 10/0583; H01M 4/663; H01M 4/688
See application file for complete search history.

(56) References Cited

U.S. PATENT DOCUMENTS 5,618,318 A    4/1997  Reddy et al.
11,316,168 B2 *  4/2022  Lee .......................... H01M 4/78
(Continued)

FOREIGN PATENT DOCUMENTS

CN    102329538 A    1/2012
CN    103843170 A    6/2014
(Continued)

OTHER PUBLICATIONS

Translation First Office Action and Search Report for corresponding Chinese application No. 201780096502.0 dated Mar. 28, 2022.
(Continued)

*Primary Examiner* — Matthew T Martin
*Assistant Examiner* — Ankith R Sripathi
(74) *Attorney, Agent, or Firm* — Sughrue Mion, PLLC

(57) ABSTRACT

A foldable flexible assembling of cells for a lithium-ion battery including: a separator containing an electrolyte; a series of n physically separated negative electrodes located on the first side of the separator and a series of n physically separated positive electrodes located on the second side of the separator; a first current collector including a layer covering continuously the series of negative electrodes so as to ensure electrical connection between all the negative electrodes; and a second current collector including a layer covering continuously the series of positive electrodes so as to ensure electrical connection between all the positive electrodes.

23 Claims, 7 Drawing Sheets

(51) Int. Cl.
*H01M 10/0583* (2010.01)
*H01M 50/534* (2021.01)
*H01M 50/538* (2021.01)

(52) U.S. Cl.
CPC ..... *H01M 10/0583* (2013.01); *H01M 50/534* (2021.01); *H01M 50/538* (2021.01)

(56) References Cited

U.S. PATENT DOCUMENTS

| | | | |
|---|---|---|---|
| 2005/0175902 A1 | 8/2005 | Parsian | |
| 2012/0058387 A1 | 3/2012 | Ahn | |
| 2014/0050957 A1 | 2/2014 | Yang | |
| 2014/0050958 A1 | 2/2014 | Kwon et al. | |
| 2014/0170456 A1 | 6/2014 | Kwon et al. | |
| 2015/0207148 A1* | 7/2015 | Kimura | H01G 11/26 429/217 |
| 2016/0126554 A1 | 5/2016 | Beneventi et al. | |
| 2016/0315352 A1 | 10/2016 | Jiang et al. | |
| 2018/0076453 A1* | 3/2018 | Durstock | H01M 4/624 |
| 2018/0151885 A1* | 5/2018 | Bosnyak | H01M 4/625 |
| 2019/0319272 A1* | 10/2019 | Kim | H01M 10/052 |
| 2019/0348681 A1* | 11/2019 | Annaka | H01M 4/622 |
| 2020/0153047 A1* | 5/2020 | Kawai | H01M 10/0587 |
| 2020/0235444 A1* | 7/2020 | Yu | H01M 10/054 |

FOREIGN PATENT DOCUMENTS

| | | | | |
|---|---|---|---|---|
| CN | 104751938 A | 7/2015 | | |
| CN | 105518907 A | 4/2016 | | |
| GB | 2298309 A | 8/1996 | | |
| JP | 2014199742 A | 10/2014 | | |
| JP | 2016192255 A | 11/2016 | | |
| JP | JPWO2019021941 | * | 3/2020 | ........ H01M 10/0525 |
| KR | 10-2012-0022385 | 3/2012 | | |
| KR | 10-2013-0045218 | 5/2013 | | |
| KR | 10-1538754 B1 | 7/2015 | | |
| KR | 10-2016-0027021 | 3/2016 | | |
| WO | 2016092888 A1 | 6/2016 | | |

OTHER PUBLICATIONS

Preliminary Office Action for corresponding Korean application No. 10-2020-7012479 dated May 30, 2022.
International Search Report for PCT/IB2017/056866 dated Jun. 8, 2018.
Written Opinion for PCT/IB2017/056866 dated Jun. 8, 2018.
International Preliminary Report on Patentability for PCT/IB2017/056866 dated Jun. 25, 2019.
Choi, S. et al., "Shape-Reconfigurable Aluminum-Air Batteries" Advanced Functional Materials, (2017), pp. 1-9, 1702244.
Hoeng, et al., "Use of nanocellulose in printed electronics: a review", The Royal Societ of Chemistry 2016, Nanoscale, (2016), pp. 13131-13154, 8.
Koga, H. et al. "Transparent, Conductive, and Printable Composites Consisting of TEMPO-Oxidized Nanocellulose and Carbon Nanotube", Biomacromolecules, (2013), pp. 1160-1165, 14, ACS Publications, American Chemical Society.
Office action issued in corresponding Chinese Patent Application No. 201780096502.0; Dated: Oct. 8, 2023 and English translation of the same.

* cited by examiner

FOLDABLE FLEXIBLE ASSEMBLING OF CELLS FOR A LITHIUM-ION BATTERY AND CURRENT COLLECTOR WITH CARBON BASED CONDUCTIVE MATERIAL

FIELD OF THE INVENTION

The present invention concerns lithium-ion batteries, in particular thin printed lithium-ion batteries. It relates, more specifically, to a foldable flexible assembling of cells for a lithium-ion battery, a lithium-ion battery comprising such assembling of cells, a current collector for a lithium-ion battery and a manufacturing method of such a current collector.

A lithium-ion battery or Li-ion battery (often abbreviated as LIB) is a type of rechargeable battery in which lithium ions move from the negative electrode to the positive electrode during discharge and back when charging. Li-ion batteries use an intercalated lithium compound as one electrode material, compared to non-rechargeable lithium battery. The electrolyte, which allows for ionic movement, and the two electrodes are the constituent components of a lithium-ion battery cell.

Lithium-ion batteries are common in home electronics. They are one of the most popular types of rechargeable batteries for portable electronics, electric tools, medical equipment, with a high energy density, tiny memory effect and low self-discharge. LIBs are also growing in popularity for heavier equipment such as two-wheeled (bicycles, mopeds) or four-wheeled (electric or hybrid motor vehicles) means of transport and vehicles, military, and aerospace applications and now also for Internet of things (IoT) or electronic wearable devices. In that respect, the request of specific form factor and light weight based batteries delivering an appropriate energy density is constantly growing.

In general, flexible batteries may be used in all applications where it is desirable that the battery should be able to deform or bend, for example in order to fill empty spaces in hybrid or electric cars or for supplying flexible electronic devices other than in all the conventional applications of rigid Li-ion batteries.

A conventional lithium-ion (Li-ion) battery comprises at least one negative electrode (anode) and at least one positive electrode (cathode), between which there is a solid electrolyte or a separator impregnated with a liquid electrolyte. The liquid electrolyte consists for example of a lithium salt in solution in a solvent selected to optimize ion transport and dissociation. In particular, in a lithium-ion battery, each of the electrodes generally comprises a current collector (usually a metal substrate), on which a composite is deposited that comprises a material that is active with respect to lithium, a polymer that performs the role of binder (for example a vinylidene fluoride (PVdF) copolymer), an agent conferring electron conductivity (for example carbon black) and a solvent.

During operation of the battery, lithium ions pass from one of the electrodes to the other through the electrolyte. During discharge of the battery, an amount of lithium reacts with the positive electrode active material from the electrolyte, and an equivalent amount is introduced into the electrolyte from the negative electrode active material, the lithium concentration thus remaining constant in the electrolyte. The insertion of lithium into the positive electrode is compensated by supply of electrons from the negative electrode via an external circuit. During charging, these phenomena take place in reverse.

The operation of flexible Li-ion batteries is the same as that described above for conventional Li-ion batteries. However, to obtain a flexible or foldable battery, it is necessary to develop, in addition, layers, including current collectors, having not only good electrical properties, but also in which the material of those layers has strong adhesion to the substrate, which makes it possible to avoid the appearance of cracks, or even detachment of these material/layer after bending the battery.

The absence of a case gives pouch cells and pouch batteries, present the highest gravimetric energy density. However, for many practical applications they still require an external means of containment to prevent expansion when their state-of-charge (SOC) level is high, and for general structural stability and mechanical protection of the pouch battery or of the battery pack of which pouch cells are part. In that respect those batteries use a pliable, namely flexible packaging, or outer cover.

The present invention concerns therefore Li-ion cells and batteries in the form of pouch, namely a soft, flat and flexible body. This type of Li-ion cells and batteries are among others largely used in cell phones; and are also often referred to as li-ion polymer batteries or lithium polymer batteries.

The present invention also concerns a current collector for such a Li-ion battery, made from an improved composition replacing the current collector foils, this composition forming a material which is easily transferrable on a substrate for a simple manufacturing method of the current collector.

DESCRIPTION OF RELATED ART

The article Choi, S. et al. «Shape-Reconfigurable Aluminum-Air Batteries». *Adv. Funct. Mater.* 1702244 (2017) presents a deformable metal-air battery where an accordion like configuration is used with a cellulose substrate covered on one of its faces with physically separated electrodes forming a series of electrodes being alternatively a positive electrode (cathode) and a negative electrode (anode). In that case, the battery pack folding concept is applied by connecting a plurality of aluminium-air cells using external electrodes. Such a configuration is relatively complex to manufacture and to assemble.

US20160315352 concerns the fabrication of a conventional planar battery folded using a rigid Origami such as Miura folding, enabling high degree of stretching and bending. As known in literature the outer layer of the battery is the most exposed to damages due to the bending and stretching stresses. The folding technique proposed in this document doesn't bring a benefit in this direction and the need of specific form factor based batteries is not addressed.

WO2016092888 relates to a battery divided in a plurality of thin or small size all solid state batteries which are mounted on a foldable substrate, increasing the folding characteristic of the entire system. In this case, the potential damaging of the outer surface of the battery is limited but the manufacturing process and especially the packaging step is not time effective because of the plurality of cells to fabricate. Moreover also in this case the need of specific form factor based batteries is not addressed.

CN104751938 discloses a conductive paste for solar cells based on ethylcellulose binder and aluminum (Al), silver (Ag) conductive particles. Even if the use of Al and Ag as conductive particles can be also suitable for battery applications, the high cost of Ag and the technical challenges in the production of water based stable Al inks however limit the use of mentioned materials for high massive production.

CN102329538 relates to a conductive ink based on ethylcellulose and carbon black (CB) particles: This conductive ink can be used as a conductive layer onto the current collector of a lithium ion batteries in order to increase the adhesion between this current collector and the next layer and also to reduce the internal resistance. However, this conductive layer does not act as a current collector but as a further layer increasing the overall weight of the battery and the number of manufacturing steps, which also does not guarantee a freedom in terms of form factor.

JP2014199742 discloses a conductive paste using nano fribrillated cellulose as thickening agent in order to avoid delamination between the electrode and the current collector. In this case the use of the nano fibrillated cellulose is limited to the elaboration of a coating for the negative electrode and not to the use in a conductive ink acting as a current collector.

Other prior art references report the use of cellulose derivatives as key component in the formulation of conductive inks, see the article from Hoeng et al., "Use of nanocellulose in printed electronics: a review", Nanoscale 8, 13131-13154 (2016). Also, in the article from Koga, H. et al. "Transparent, Conductive, and Printable Composites Consisting of TEMPO-Oxidized Nanocellulose and Carbon Nanotube", *Biomacromolecules* 14, 1160-1165 (2013), reported the use of nano fibrillated cellulose in the synthesis of carbon nanotube based inks, suitable for fabrication of flexible conductive films applicable in electronic devices. The conductive ink described by Koga et al. is not consistent with the possible formation of a current collector, notably due to the very low viscosity of the ink as described.

It is an aim of the invention to propose a foldable flexible assembling of cells for a lithium-ion battery, a current collector for a lithium-ion battery and a lithium-ion battery also with associated manufacturing methods which are alternative to known solutions.

Another aim of the present invention is to propose a foldable flexible assembling of cells for a lithium-ion battery, a current collector for a lithium-ion battery and a lithium-ion battery also with associated manufacturing methods obviating or mitigating one or more disadvantages of known solutions.

It is a first aspect of the invention to provide a solution in which the energy density per unit of surface of the assembling of cells or of the battery is increased and maximized.

It is another aim of the invention according to the first aspect to provide a solution which does not increase the number of layers, namely of printed layers, which means to provide a solution in which the manufacturing process of the battery is not rendered more complex, but can even be simplified.

It is a second aspect of the invention to provide a solution in which a current collector, which can be used in the assembling of cells or in the lithium-ion battery, presents a composition that allow to the current collector to be flexible to be easily associated with other components in a flexible overall structure.

It is another aim of the invention according to the second aspect to provide a solution with a light, thin and flexible current collector, and also a possibly eco-friendly solution with a current collector where materials used are eco-friendly in order to reduce the environmental impact and simplify the recyclability of the battery.

It is another aim of the invention according to the second aspect to provide a solution in which the material of the current collector can be transferred on a substrate by a printing or spray deposition technique.

It is another aim of the invention to provide solutions where the assembling of cells or of the battery follows the specific form factor requested for the flexible electronic application and delivers the appropriate energy density, while keeping a light weight.

BRIEF SUMMARY OF THE INVENTION

According to a first aspect of the invention, it is proposed a foldable flexible assembling of cells for a lithium-ion battery comprising:

a separator formed by a central band containing an electrolyte and defining, when in flat configuration, a longitudinal direction between a first end and a second end, a series of n negative electrodes (13) located on the first side of the separator and which are disposed along said longitudinal direction, each negative electrode of a pair of adjacent electrodes being physically separated from the other negative electrode of said pair of adjacent electrodes along a negative electrode separation line orthogonal to said longitudinal direction, with n being an integer equal to or larger than two, a series of n positive electrodes located on the second side of the separator and which are disposed in a longitudinal direction, each positive electrode of a pair of adjacent electrodes being physically separated from the other positive electrode of said pair of adjacent electrodes along a positive electrode separation line orthogonal to said longitudinal direction, wherein each negative electrode corresponds to an opposite positive electrode, wherein a portion of said separator, each negative electrode located on the first side of the separator and the corresponding positive electrode located on the second side of the separator form an individual cell, wherein each of said positive electrode separation line corresponds to an opposite negative electrode separation line, each said positive electrode separation line forming with said corresponding opposite negative electrode separation line a folding zone between two adjacent individual cells, a first current collector comprising a layer covering continuously said series of negative electrodes (13) so as to ensure electrical connection between all said negative electrodes (13)

a second current collector comprising a layer covering continuously said series of positive electrodes so as to ensure electrical connection between all said positive electrodes.

Such an assembling of cells presents a specific geometrical configuration of the cells formed side by side and in parallel to each other along the longitudinal direction of the central band formed by the separator when the overall band formed by this assembling of cells is in flat configuration. This specific geometrical arrangement allow an accordion-like folding of the assembling of cells resulting in superposed individual cells without electrode at the folding zones.

This specific geometrical arrangement based on a folding of the cells, where each cell is folded along the edge line separating a cell from the adjacent on, forms a particular stacking method of the cells which enables the increment of the energy density delivered by the battery without reducing the areal energy density as will be shown.

In a preferred embodiment, a lithium-ion battery is proposed, comprising said assembling of cells which is folded like an accordion around at least one folding line formed by a pair of corresponding positive electrode separation line and negative electrode separation line, wherein each fold contains at least one individual cell, wherein it further comprises a flexible outer cover defining an internal space containing said accordion-like folded assembling of cells.

With such configuration, once the folding of the assembling of cells is performed, a packaging material forming the outer cover is used to wrap said assembling of cells and seal hermetically the battery.

According to a second aspect of the invention, it is firstly proposed a current collector comprising:
- at least two conductive materials among the following: carbon based materials and water-soluble or water-dispersible conductive polymers, said conductive materials including at least one carbon based material and being in an total amount in the range from about 70 to 99.5 per weight % relative to the total weight of the current collector,
- at least one binder comprising a lignocellulosic material selected from the group consisting of cellulose fibres, refined cellulose fibres, cellulose microfibrils or microfibrillated cellulose (MFC), cellulose nanofibrils and lignin, in an amount in the range from about 0.5 to 30 weight % relative to the total weight of the current collector.

With such a composition of the current collector, the invention enables the replacement of bulk current collectors used conventionally in the manufacturing of lithium ion batteries. The formulated inks used to form the current collector have tuned electrical and rheological properties based on carbon conductive particles and cellulose derivatives. In this way the thickness and consequently the weight of the entire battery is reduced.

According to the second aspect of the invention, it is secondly proposed a manufacturing method of a foldable and flexible current collector for a lithium-ion battery comprising the following steps:
i) providing a conductive ink prepared by dispersing said mixture of solid particles in an aqueous phase, wherein said mixture of solid particles comprises:
- at least two conductive materials among the following: carbon based materials and water-soluble or water-dispersible conductive polymers, said conductive materials including at least one carbon based material and being in an total amount in the range from about 70 to 99.5 per weight % relative to the total weight of the mixture of solid particles,
- at least one binder comprising a lignocellulosic material selected from the group consisting of cellulose fibres, refined cellulose fibres, cellulose microfibrils or microfibrillated cellulose (MFC), cellulose nanofibrils and lignin, in an amount in the range from about 0.5 to 30 weight % relative to the total weight of the mixture of solid particles,
ii) providing a flexible substrate,
iii) transferring said conductive ink obtained above in step i) onto at least a portion of one of the faces of said flexible substrate by a printing or spray deposition technique so as to obtain a substrate covered by said conductive ink; and
iv) drying said substrate covered by said conductive ink to obtain a flexible current collector comprising the substrate and current collector film on at least a portion of one of the faces of said flexible substrate.

With such an ink composition, it is possible to tune the rheological properties of the ink for an easy up-scalable process such as screen printing technique that can be used to transfer the ink onto the positive or negative layer with a specific form factor according to the pattern of the screen used for deposition. Therefore, the manufacturing process of the current collector, that can use any of the screen printing, flexography and gravure printing techniques, is very easy and simple to implement at a large scale for mass production, In an embodiment said substrate is an outer cover for a lithium-ion battery, wherein in step ii) said ink is transferred on the inner side of the outer cover, in order to form a current collector portion on the inner side of the outer cover, said collector portion being able to be electrically connected with the cells of the lithium-ion battery. In that situation, the flexibility of the battery is possible by transferring the current collectors on the inner side of the outer cover that form the pouch for the battery.

In that case, the printing or deposition of the conductive layer forming the current collector is implemented directly onto the inner side of the outer cover that will form the battery packaging. This provision allows using the outer cover not only as a mechanically protective layer but also as a potential substrate for the printing of the current collector. When such a current collector extends beyond the outline of the assembling of cells, and moreover beyond the limit of the internal space defined by the outer cover, it forms an electric connector that can serve for any electrical or electronic external component.

In another embodiment, said substrate is formed by a sandwich-like structure comprising a separator formed by a central band containing an electrolyte, and positive electrode (s) and negative electrode(s) disposed on the separator, wherein said ink forms, after said drying step iv), a current collector film on said substrate, said current collector film covering at least part of said positive and negative electrodes (13), forming thereby a battery. In a possible embodiment, the current collector extends along the whole or almost the whole length of the sandwich formed by the central band covered with the negative and positive electrodes, preferably on the two sides of the central band, so as to be electrically connected to negative and positive electrodes. Preferably a first current collector located on a first side of the central band covered with a series of n negative electrodes (13) electrically connect together these n negative electrodes (13), and a second current collector located on a second side of the central band covered with a series of n positive electrodes electrically connect together these n positive electrodes.

In both previous cases, all configurations are possible in terms of number and arrangements of the positive and negative electrodes (13) of the cell(s), and in terms of number and arrangements of the cells of the battery including that defined according to the assembling of cells of the first aspect of the invention.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
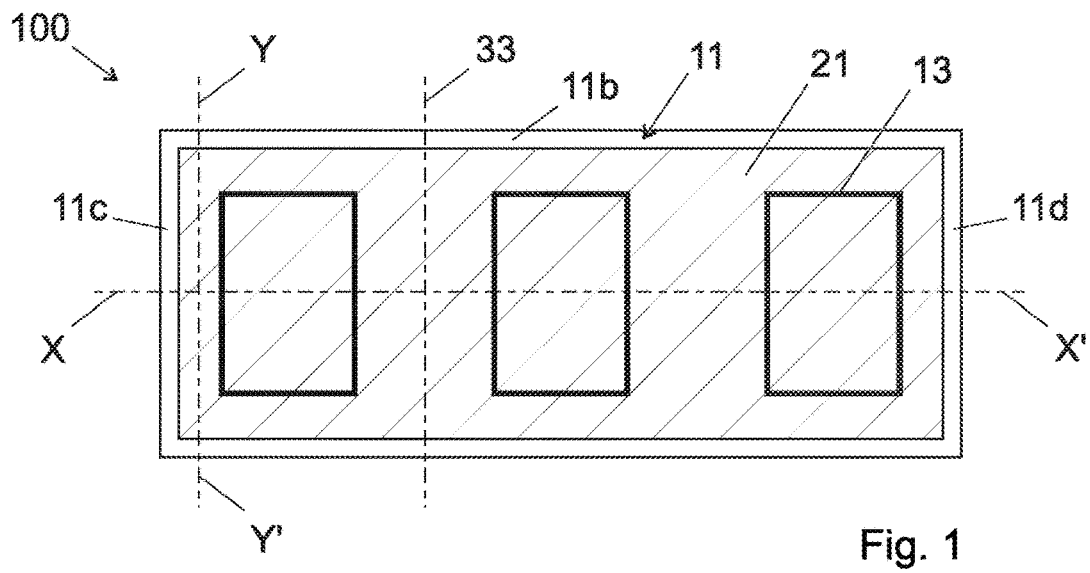
FIG. 1 shows a schematic projection view, partially transparent, from a first side of a foldable flexible assembling of cells according to the first aspect of the invention, in a first embodiment and in a flat configuration.

In the figures, the same reference signs have been used throughout to indicate the same of equivalent parts. Also, It should be noted that the thicknesses of the various layers shown have been greatly exaggerated in the drawings in the interest of clarity.

In the present text, a "cell" is a basic electrochemical unit that contains the negative and positive electrodes, separator, and electrolyte, and current collectors. A "battery" or "battery pack" is a collection of cells or cell assemblies which are ready for use, as it contains an appropriate housing or outer cover, electrical interconnections (connection tab as presented in details later), and possibly electronics to control and protect the cells.

Also, the term "cathode" designates the positive electrode in the discharge cycle and the term "anode" designates the negative electrode in the discharge cycle, even when the associated electrochemical reactions change their places when charging and discharging, respectively. For lithium-ion cells the positive electrode ("cathode") is the lithium based one.

Figure 2:
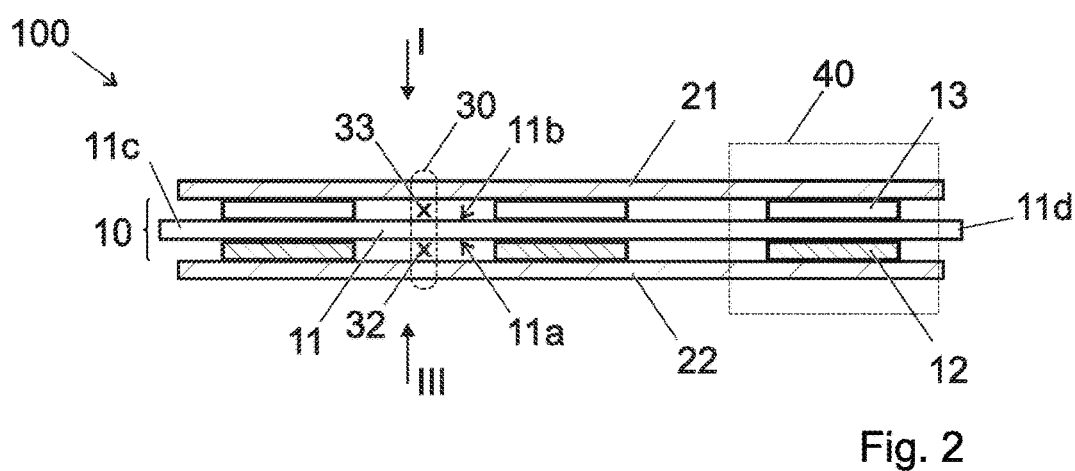
FIG. 2 shows a schematic projection view from the edge of the foldable flexible assembling of cells shown in FIG. 1.
Figure 3:
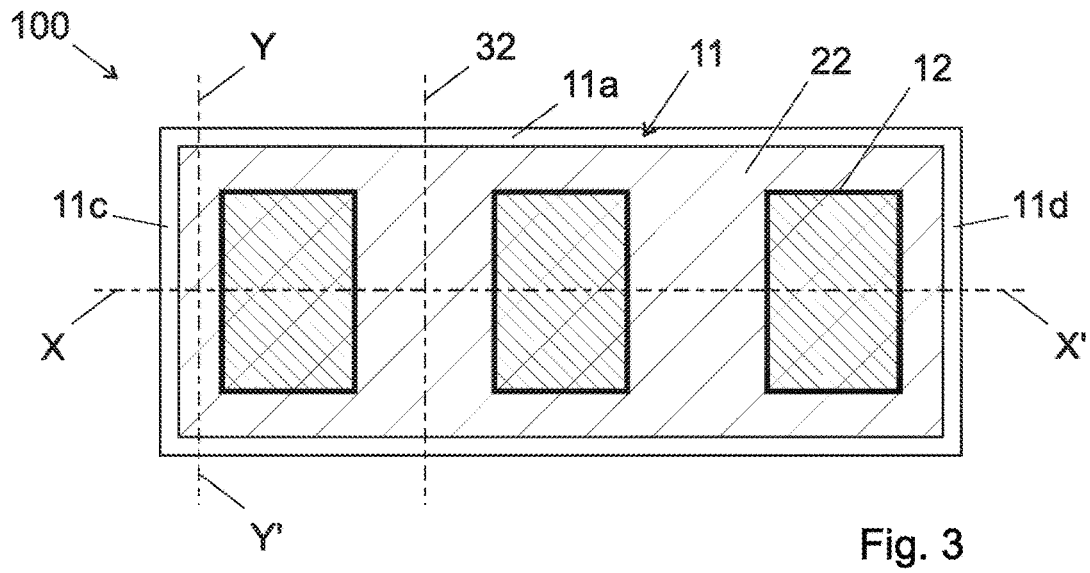
FIG. 3 shows a schematic projection view, partially transparent, from the second side the foldable flexible assembling of cells shown in FIG. 1 and FIG. 2.

When referring to FIGS. 1 to 3, a foldable flexible assembling of cells 100 is shown in flat configuration as an example of a possible implementation of the first aspect of the invention. This assembling of cells 100 is formed with a stacking of flexible layers enabling the further folding of this assembling of cells. A central part 10 forming the active part of the cells comprises a separator 11, a series of three negative electrodes (13) 12 and a series of three positive electrodes 13.

The separator 11 forms a flat central band defining a first side 11a or face and a second (opposite) side 11b or face, this flat band extends along a rectilinear longitudinal direction X-X' parallel to the largest dimension (or length) of the separator 11, between a first end 11c and a second end 11d. The first side 11a of the separator 11 is covered by said series of three negative electrodes (13) 12 and the second side 11b of the separator 11 is covered by said series of three positive electrodes 13. This separator also defines a transversal direction Y-Y' orthogonal to said longitudinal direction X-X' and to the second largest dimension or width of the separator 11.

The separator 11 contains the electrolyte for all the cells of the assembling of cells. This separator 11 is either a solid electrolyte (for example based on a vitreous material or a polymeric material such as a thermo/photo-setting gel polymer, for example methacrylic based) or a supporting part impregnated with a liquid electrolyte, in both cases the supporting part is porous.

For example, this electrolyte consists in a lithium salt in solution in a liquid solvent. In an embodiment, this electrolyte consists in a lithium based salt in a liquid solvent gelled by adding a polymer obtained from one or more monomers selected from ethylene oxide, propylene oxide, methyl methacrylate, methyl acrylate, acrylonitrile, methacrylonitrile, and vinylidene fluoride. Such a polymer presents a structure that may be of the linear, comb, random, alternating or block type, this polymer being crosslinked or not.

Such a separator has generally a thickness ranging from about 10 to 800 μm.

In order to be adapted to the further folding of the assembling of cells, in the series of three positive electrodes 12, each positive electrode 12 is physically separated from the adjacent positive electrode 12 or the two adjacent positive electrode 12 by a space defining a positive electrode separation line 32. Also, in the series of three negative electrodes (13) 13, each negative electrode 13 is physically separated from the adjacent negative electrode 13 or the two adjacent negative electrode 13 by a space defining a negative electrode separation line 33. Therefore, in the series of positive (negative) electrodes 12 (13), the positive (negative) electrodes 12 (13) are placed next to each other. Also, in the series of three negative electrodes (13) 13, each negative electrode 13 faces, at least partially a corresponding opposite positive electrode 12. In the examples of FIGS. 1 to 3 and FIG. 11 to 13, each of the positive electrodes 12 is placed face to face with one of the negative electrodes (13) 13.

In that situation, in a preferred embodiment, as shown in the examples of FIGS. 1 to 3 and FIG. 11 to 13, the pitch between two adjacent positive electrodes 12 in the series of positive electrodes 12 is the same than the pitch between two negative electrodes (13) 13 in the series of negative electrodes (13) 13.

Also, in a preferred embodiment and as shown in the examples of FIGS. 1 to 3 and FIG. 11 to 13, the series of n negative electrodes (13) 13 are disposed in parallel configuration along said longitudinal direction X-X' and said series of n positive electrodes 12 are disposed in parallel configuration along said longitudinal direction X-X'.

The series of negative (positive) electrodes 13 (12) forms a line of electrodes, namely a row of individual electrodes, disposed along the longitudinal direction X-X'. In the examples shown in the drawings, only one negative (positive) electrode 13 (12) is present at a specific longitudinal location along the separator 11. Nevertheless without departing from the scope of the present invention, one could consider using two or more adjacent distinct sub-electrodes placed side by side along the transversal direction Y-Y' of the separator and forming together an individual electrode or an "electrode" in the sense of the present text, which is placed at a specific longitudinal location along the longitudinal direction of the separator 11.

For instance, the positive electrode material is selected from $Li_xMn_yO_4$ ($0<x<2$, $0<y<2$ and $x+y=3$), $LiCoO_2$, $LiMPO_4$, (M=Fe, Mn, Co, Ni), $LiAl_xCo_yNi_zO_2$ ($0<x<1$, $0<y<1$, $0<z<1$ and $x+y+z=1$) and $LiNi_{(1-y)}Co_yO_2$ ($0\leq y\leq1$). For instance, the negative electrode active material is selected from: graphite, hard carbon, soft carbon and the metal alloys $Li_yM$ ($1<y<5$ and M=Mn, Sn, Pb, Si, In, Ti)

The manufacturing method of these electrodes may be as described in document WO2013050713 or in document WO2014207358.

Between two adjacent negative (positive) electrodes 13 (12), there is either nothing (which means air) or a divider made of a material which is electrically insulator but ionic conductor. Such a material may be the same as the electrolyte of the central band or selected from the following material list: a cellulosic substrate, a polymer film and a polymer membrane optionally reinforced with cellulose.

The assembling of cells 100 comprises in addition to said central part 10 two outer layers for electronical connection between all the electrodes of a series of negative electrodes (13) 12 or of positive electrodes 13. These outer layers of the assembling of cells 100 constitute respectively current collectors 21 and 22, respectively for all the negative electrodes (13) 13 and for all the positive electrodes 12.

As shown on the examples of FIGS. 1 to 3 and FIG. 11 to 13, each positive electrode separation line 32 forms with said corresponding opposite negative electrode separation line 33 a folding zone 30 between two adjacent individual cells 40. It means that no electrode is located at the folding zones 30 of the assembling of cells 100, said folding zones 30 separating adjacent individual cells 40 (individual cells 40a, 40b and 40c as mentioned on FIGS. 4 and 5).

For example, when said assembling of cells 100 is in flat configuration, said folding zone 30 extends along said longitudinal direction with a distance ranging between 25% to 100% of the width of a cell 40, said width being measured along said longitudinal direction X-X'. In an embodiment, when said assembling of cells 100 is in flat configuration, said folding zone 30 extends along said longitudinal direction X-X' with a distance ranging between 25% to 100% of the width of one negative/positive electrode 12/13 measured along said longitudinal direction X-X'.

As a collector layer may be printed on the inner side of the outer cover 110 as will be described later, in an embodiment, the layer forming the first (second) current collector 21 (22) might not cover the entire surface of the positive (negative) electrode 12/13 of the end cells located at the end of the separator 11.

In a preferred embodiment, at least one of said first current collector 21 and said second current collector 22 comprises an end portion extending beyond said series of negative electrodes (13) 13 or positive electrodes 12. In that respect, and as shown in the examples of FIGS. 1 to 3 and FIG. 11 to 13, in a preferred embodiment, both first current collector 21 and second current collector 22 comprises an end portion extending beyond the outline of said series of negative electrodes (13) 13 or positive electrodes 12. In that situation, the first current collector 21 is a unique and sole layer covering the whole surface of the series of negative electrodes (13) 13 and the second current collector 22 is a unique and sole layer covering the whole surface of the series of positive electrodes 12.

To form such a first or second current collector 21 or 22, it is proposed to possibly use a bio-sourced conductive ink for current collector prepared by dispersion of a mixture of solid particles in an aqueous phase, wherein said mixture of solid particles comprises:
 at least two conductive materials among the following: carbon based materials and water-soluble or water-dispersible conductive polymers, said conductive materials including at least one carbon based material and being in an total amount in the range from about 70 to 99.5 per weight % relative to the total weight of the mixture of solid particles,
 at least one binder comprising a lignocellulosic material selected from the group consisting of cellulose fibres, refined cellulose fibres, cellulose microfibrils or microfibrillated cellulose (MFC), cellulose nanofibrils and lignin, in an amount in the range from about 0.5 to 30 weight % relative to the total weight of the mixture of solid particles.

In that situation, the current collector 21 and 22 also comprises:
 at least two conductive materials among the following: carbon based materials and water-soluble or water-dispersible conductive polymers, said conductive materials including at least one carbon based material and being in an total amount in the range from about 70 to 99.5 per weight % relative to the total weight of the current collector 21 and 22,
 at least one binder comprising a lignocellulosic material selected from the group consisting of cellulose fibres, refined cellulose fibres, cellulose microfibrils or microfibrillated cellulose (MFC), cellulose nanofibrils and lignin, in an amount in the range from about 0.5 to 30 weight % relative to the total weight of the current collector 21 and 22.

In an embodiment, at least two conductive materials are carbon based materials. These carbon based materials are used in view to confer a high electronic conductivity to the current collector.

In an embodiment, said two conductive materials comprises at least carbon black and graphite powder.

In an embodiment, said two conductive materials comprise carbon black. As an example, this carbon black is present according to a total amount in the range from about 2.5 to 5 per weight % relative to the total weight of the current collector or of the total weight of the mixture of solid particles.

In an embodiment, said two conductive materials comprises graphite powder. Said graphite powder is present according to a total amount higher than 90 per weight % relative to the total weight of the current collector or of the total weight of the mixture of solid particles. As an example, the particles of this graphite powder may be disc-shaped. Also, as an example, the particles of this graphite powder may present a mean size ranging between 10 micrometers and 30 micrometers.

In an embodiment, said binder comprises a lignocellulosic material present according to a total amount ranging from 1 to 3% per weight relative to the total weight of the current collector or of the mixture of solid particles. In an example, said binder consists only in cellulose microfibrils or microfibrillated cellulose (MFC).

In an embodiment, said mixture of solid particles (therefore said collector) further comprises an anti-flocculant agent comprising a lignocellulosic material present according to a total amount ranging from 0.5 to 5 per weight % or ranging from 2 to 5 per weight % relative to the total weight of the current collector or of the mixture of solid particles. In an example, said anti-flocculant agent is carboxymethyl cellulose (CMC). In an example, said anti-flocculant agent is carboxymethyl cellulose (CMC) and said binder is microfibrillated cellulose (MFC).

Also, in an example of the conductive ink that may be used to form the current collectors 21 and 22, said mixture of solid particles represent at least about 25 weight % of the total weight of the current collector ink: in that situation a possible advantage is created because of a faster drying of the printed ink of the current collector 21 and 22 or an increased viscosity of the ink leading to thicker printed dried current collectors 21 and 22.

In a possible embodiment, the manufacturing method for the current collectors 21 and 22 comprises the following steps:
  providing a central part 10 as defined above, said central part 10 forming a flexible substrate for the formation of the current collectors 21 and 22,
  providing a conductive ink as defined above,
  transferring said conductive ink onto at least a portion of one of the faces of said flexible substrate by a printing or spray deposition technique so as to obtain a substrate covered by said conductive ink; and
  drying said substrate covered by said conductive ink to obtain a flexible current collector film on at least a portion of one of the faces of said flexible substrate.

Among these printing or spray deposition techniques, a possibility lies in screen printing technique. Before the drying step, a soft calendering or lamination process is possible to densify the layers and reduce the porosity of the conductive layers. The pressure load of the calender may range from 10 to 3000 kg/cm$^2$. The drying process required to remove the water based solvent from the printed conductive layers can be carried out under vacuum to promote rapid removal of water. This drying process is possibly carried out at a temperature ranging between 60 and 100° C.

As an example, after said transfer of the conductive ink on the substrate, this transferred conductive ink is dried, resulting in a thickness which is comprised between 2 micrometers and to 200 micrometers, and possibly between 30 and 40 micrometers.

Figure 4:
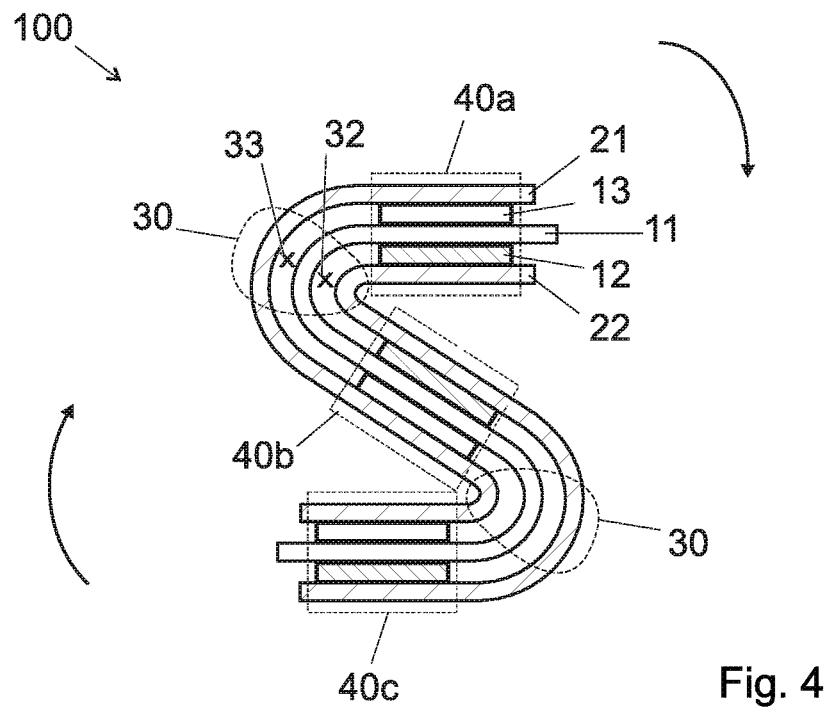
FIG. 4 shows a schematic projection view from the edge of the foldable flexible assembling of cells shown in FIG. 1 to 3, after partial folding.
Figure 5:
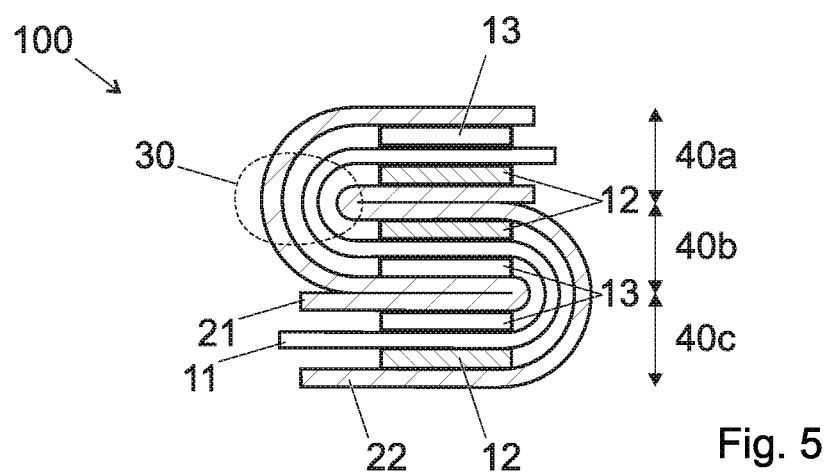
FIG. 5 shows a schematic projection view from the edge of the foldable flexible assembling of cells shown in FIG. 1 to 4, after complete folding into an accordion like configuration and flattening of the assembling of cells.

Referring to FIGS. 4 and 5, the assembling of cells 100 previously described and shown in flat configuration in FIGS. 1 to 3 is folded like an accordion around two folding zones 30 or folding lines, each being formed by a pair of corresponding positive electrode separation line 32 and negative electrode separation line 33.

As can be visible on FIGS. 2 and 4, each positive electrode separation line 32 is superposed with the corresponding, opposite negative electrode separation line 33; said positive electrode separation line 32 and corresponding negative electrode separation line 33 belonging to the folding zone 30.

In FIGS. 4 and 5 is shown an accordion-like folded assembling of cells 100 wherein each fold contains a single individual cell.

In FIG. 5 is shown an accordion-like folded assembling of cells 100 which is formed by folding said assembling of three cells around two folding zones 30 or folding lines. More generally, the disclosure concerns an accordion-like folded assembling of cells 100 which is formed by folding said assembling of n cells around n−1 folding zones 30 or folding lines (n being and integer, possibly an odd integer), forming thereby n superposed folds. Generally, the disclosure also concerns an assembling of cells 100 wherein each fold contains at least one individual cell.

After folding and flattening, said assembling of cells 100 forms a Z configuration where in the cells stack (individual cells 40a, 40b and 40c as mentioned on FIGS. 4 and 5), the arrangement of the electrodes is such that a pair of superposed negative electrodes (13) alternates 13 with a pair of superposed positive electrodes 12 (with interposition of two layers of current collector 21 or 22). Also when n is an odd integer (in FIGS. 1 to 5, n=3), said folded assembling of cells 100 forms a sandwich where the two outer electrodes (individual cells 40a and 40c on FIGS. 4 and 5) have a different polarity, namely one outer electrode is a positive electrode 12 where the other outer electrode is a negative electrode 13. Thanks to that provision, it is easy to electrically connect the assembling of cells 100 to any adapted equipment, including connecting equipment, using the outer electrodes. Also, after folding and flattening of said assembling of cells 100, the different folds are superposed and in contact with the adjacent fold or the adjacent folds. The separator 11 ensures the electrical insulation between each side (each electrode) of the cell (and battery). According to this particular configuration, the capacity or the potential of the battery will be the sum of the individual contribution of each cell.

Figure 6:
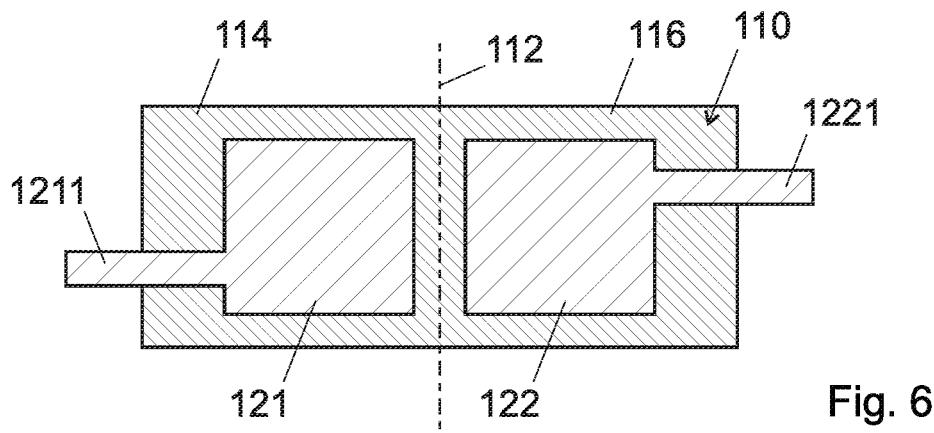
FIG. 6 shows a schematic projection from a first side of a foldable flexible assembling of an outer cover and current collector according to the second aspect of the invention, in a possible embodiment and in a flat configuration.
Figure 7:
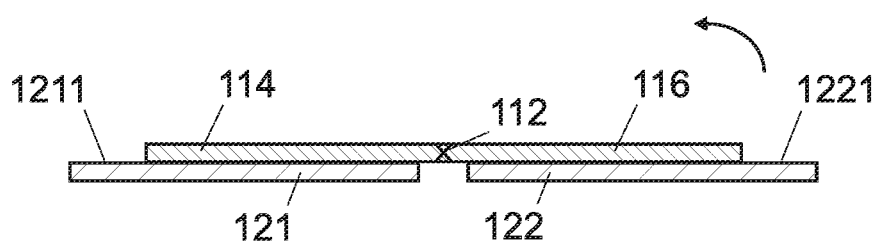
FIGS. 7 and 8 show a schematic projection from the edge of the foldable flexible assembling shown in FIG. 6, respectively in flat and in folded or bent configuration.

Referring to FIGS. 6 and 7, is shown a packaging for containment of said previously described assembling of cells 100, in order to form a pouch type battery. More precisely, there is a flexible outer cover 110 able to define an internal space 118 by folding of the flexible outer cover around a folding line 112, defining thereby two superposed flaps 114 and 116. These flaps 114 and 116 define outer walls for the internal space 118 as explained below. There are also two flexible electric connectors 121, 122 disposed on the inner side of the flexible outer cover 110, respectively on the flaps 114, 116. In an embodiment, these two electric connectors 121, 122 are made according to the same technique and have the same composition as previously described for the current collectors 21 and 22 of the assembling of cells 100. These two electric connectors 121, 122 are physically separated from either side of the folding line 112. These two electric connectors 121, 122 form an external portion 1211 and 1221 extending beyond the edge of the outer cover, in order to form a connection tab when the outer cover (containing the assembling of cells 100) is closed. This connection tab is useful for the electrical activation of the battery.

Figure 8:
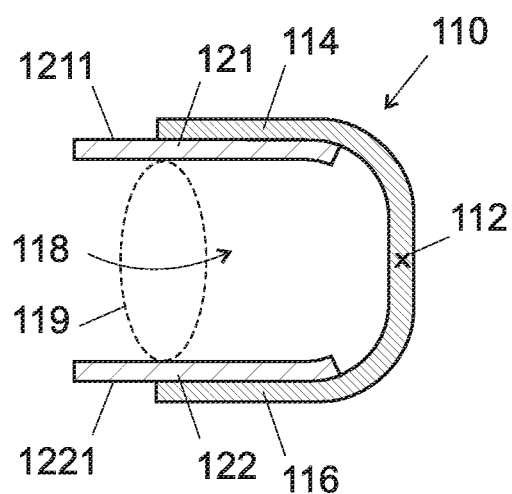

As shown in FIGS. 7 and 8, after folding of the outer cover 110 around the folding line 112, the two electric connectors 121, 122 are face to face, and facing the internal space 118. Also, the external portions 1211 and 1221 extends outside the internal space 118, projecting outside at locations of the edge of the opening 119 of the internal space 118.

Figure 9:
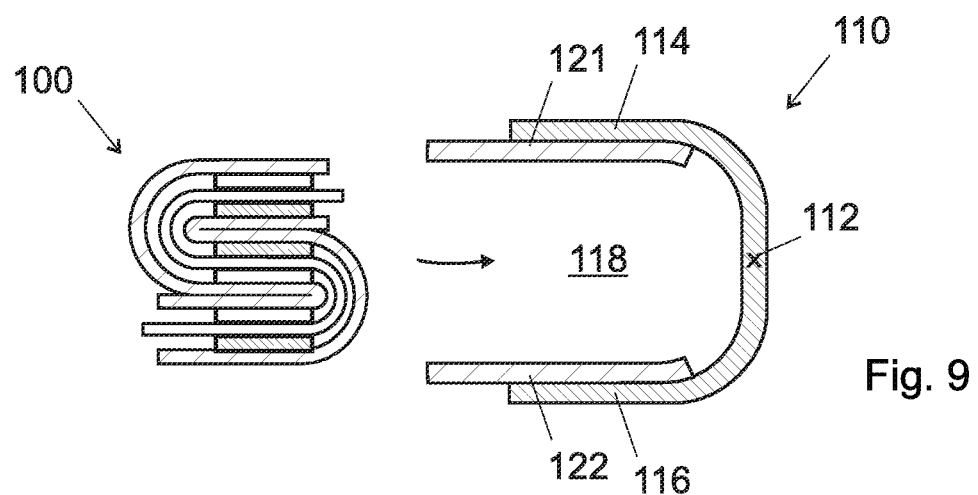
FIG. 9 shows a first mounting step between an accordion-like folded assembling of cells of FIG. 5 and the bent assembling of FIG. 7, to form a lion-lithium battery.
Figure 10:
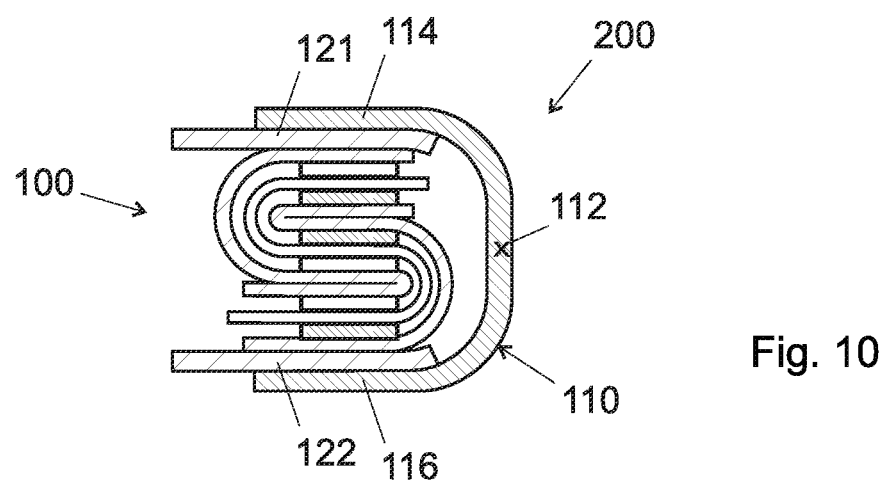
FIG. 10 shows the lion-lithium battery of FIG. 9 after the second mounting step, when the folded assembling of cells is in contact with the current collectors of the bent assembling of FIG. 7; it forms an ion-lithium battery with a so-called "front/back" layout including a current collector according to a possible embodiment of the second aspect of the invention.

Referring to FIGS. 9 and 10, the folded assembling of cells 100 of FIG. 5 is put inside the internal space 118, either by entering through the opining 119 of said internal space 118, or by folding the outer cover 110 around the folded assembling of cells 100. As a result, the two electric connectors 121, 122 are respectively facing and contacting the current collector 21 and the current collector 22 of the folded assembling of cells 100. In that situation, the current collector 121 is electrically connected with said first current collector 21 and the current collector 122 is electrically connected with said second current collector 22 of the folded assembling of cells 100. Then, the folded assembling of cells 100 contained in said internal space 118 is compressed in the direction orthogonal to the two opposite walls of the outer cover and said internal space 118 is sealed, preferably hermetically sealed.

More generally, in order to constitute a lithium-ion battery, in addition to the folded assembling of cells 100, it is further comprised a flexible outer cover 110 defining an internal space 118 containing said accordion-like folded assembling of cells 100 as shown in FIG. 10. As already explained, said flexible outer cover comprises two adjacent flaps 114 and 116 foldable with respect to each other to form two opposite outer walls attached to each other along their respective edge, thereby defining said internal space for said assembling of cells 100.

In another embodiment, the inner face of at least one flap of said flexible outer cover 110 is covered by an inner portion of an electric connector 121 or 122 which is electrically connected with either said first current collector 21 or said second current collector 22 of the assembling of cells 100; this electrical connection is implemented by the physical contact between the electric connector 121 or 122 and the first current collector 21 or said second current collector 22. In an embodiment, as shown in FIG. 10, this electric connector 121 (122) comprises an external portion extending beyond the limit of said internal space 118 in order to form a connection tab.

The thickness of said flexible lithium-ion battery 200 as obtained (shown in FIG. 10) is comprised between 100 micrometers and 10 millimeters. This allows to adapt and optimize the shape and the dimension of the battery according to the request of the final user.

Figure 11:
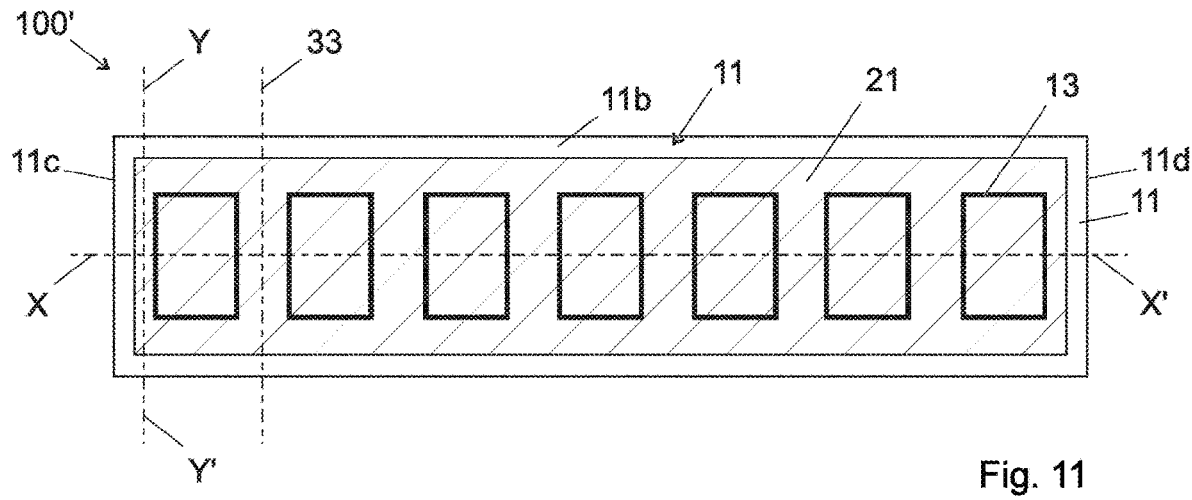
FIG. 11 shows a schematic projection view, partially transparent, from a first side of a foldable flexible assembling of cells according to the first aspect of the invention, in a second embodiment and in a flat configuration.
Figure 12:
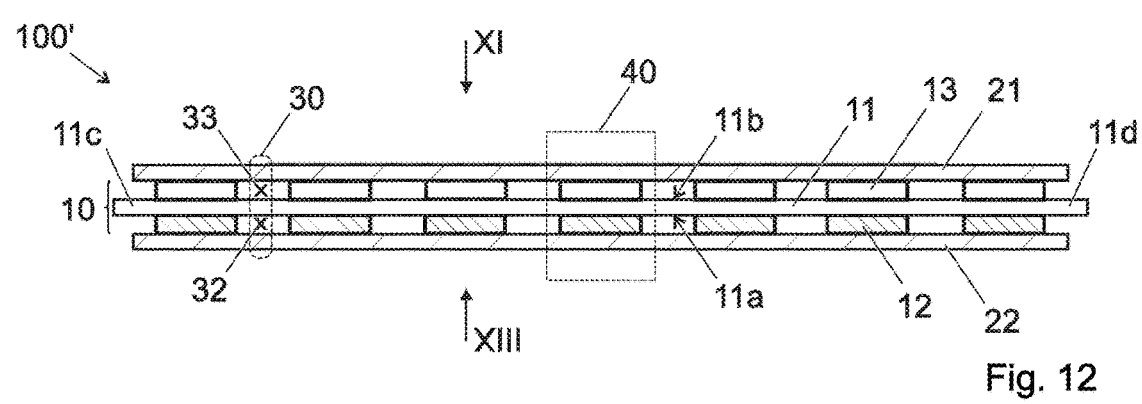
FIG. 12 shows a schematic projection view from the edge of the foldable flexible assembling of cells shown in FIG. 11.
Figure 13:
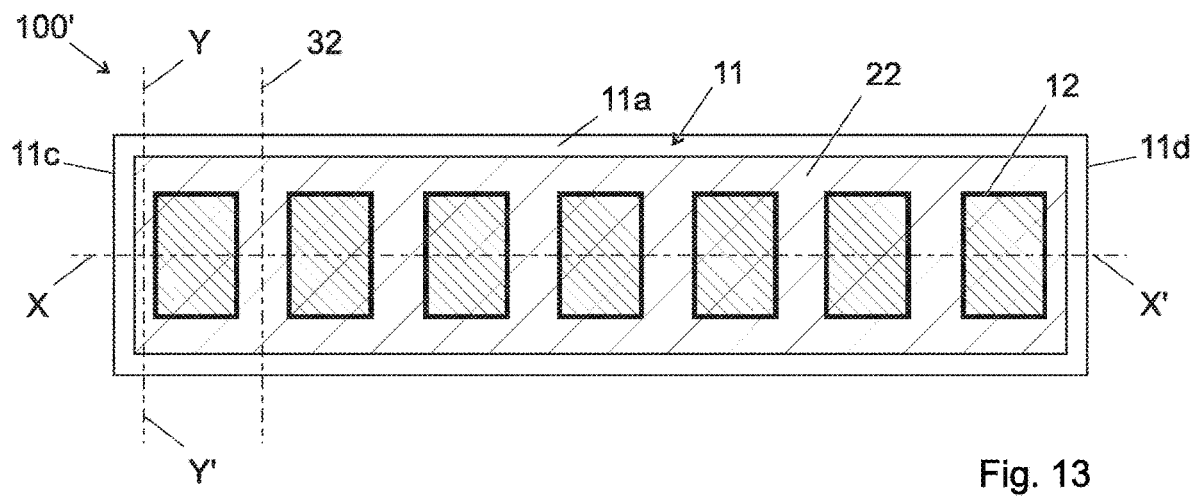
FIG. 13 shows a schematic projection view, partially transparent, from the second side the foldable flexible assembling of cells shown in FIG. 11 and FIG. 12.

Referring to FIGS. 11 to 13 is shown a assembling of cells 100' which only differs from the previously described assembling of cells 100 in that the separator 11 is longer and supports seven positive electrodes 12 on its first side 11a and seven corresponding negative electrodes (13) 13 on its second side 11b.

Referring to FIG. 6 to 10, according to a possible embodiment for manufacturing the outer cover 110 equipped with electric connectors 121, 122 forming current collectors, the outer cover 110 comprises at its inner side a first polymer film, and prior to transfer the conductive ink on said inner side of said outer cover 110, there is a further preliminary step which consists in a corona discharge treatment of the outer surface of said first polymer film to render hydrophilic said outer surface of said first polymer film. In that respect, the first polymer film of the outer cover comprises any of the following materials or is made from any of the following materials: polyethylene (PP), cast polypropylene (c-PP), polypropylene (PE), ethylene vinylacetate (EVA), and a combination thereof. The thickness of the first polymer film can be comprised between 5 micrometers to 50 micrometers.

According to an embodiment, said outer cover 110 is formed by a metal/polymer multilayer arrangement which comprises said first polymer film as external layer of the inner side of the outer cover 110 (which inner side is covered with said electric connectors 121 and 122), and which further comprises a metallic intermediate layer and a second polymer film as external layer of the outer side of the outer cover 110. This metallic intermediate layer possibly comprises or is made of any of the following materials: aluminum (Al), copper (Cu), stainless steel (SUS), and an alloy thereof. The thickness of the metallic intermediate layer film can be comprised between 5 micrometers to 50 micrometers. Said second polymer film possibly comprises or is made of any of the following materials polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and a combination thereof. The thickness of the second polymer film n be comprised between 5 picometers to 50 micrometers.

In the present disclosure, there are several possible options for manufacturing a current collector according to the second aspect of the present invention. Such a current collector can be obtained by drying a conductive ink as defined above, this conductive ink having been previously transferred on a substrate. In an embodiment such substrate is an outer cover so that at least one, or notably two, current collector(s) is (are) formed directly on the outer cover that will form the packaging of the battery. In an embodiment such substrate is a central part formed by a separator covered by a series of negative electrodes (13) on one face and by a series of positive electrodes on the other face of the substrate. In an embodiment, such a current collector comprises notably at least two conductive materials among the following: carbon based materials and water-soluble or water-dispersible conductive polymers, said conductive materials including at least one carbon based material, and said current collector further comprises at least one binder comprising a lignocellulosic material.

Example 1: Formulation of Bio-Sourced Conductive Inks

A conductive bio-sourced ink has been formulated according to the following composition in weight %: 3% Carboxymethil cellulose CMC, 1% microfibrillated cellulose MFC, 3% Carbon Black CB and 93% graphite powder GP. The concentration by weight of the solid particles inside the ink at the end of the dispersion phase is 35%. Carboxymethil cellulose (CMC) was dispersed deionized water using a mechanical blade dispersing machine. The speed of the dispersion was then reduced and graphite powder was added to the dispersing machine. The resultant mixture was then left to disperse. The speed of the dispersion was than reduced and microfibrillated cellulose (MFC) in aqueous suspension was added to the dispersing machine. The resultant mixture was then left to disperse. The remaining amount of microfibrillated cellulose MFC and graphite powder GP are added to the suspension by following the same procedure as previously described for carboxymethil cellulose CMC and graphite powder. The mixture obtained was furtherly dispersed. The dispersed mixture thus obtained was homogenized by means of a dispersing machine.

This composition has been chosen to maximize the printability of the ink and the electrical properties of the resulted printed current collector. It has been found that a percentage of carbon black CB ranging between 2.5 and 5% ensures a high electrical conductivity. Moreover, the thickening role of carbon black CB in the ink requires an increment of the disperser in order to be in line with the rheological requirement of the screen printing process. It has been found that a percentage of CMC ranging between 2 and 5% ensures a very good printability of the ink and does not affect the electrical conductivity of the printed current collector ink.

When graphite powder GP particles is present according to a weight percentage higher than 90% in the mixture of particles, this ink composition ensures a very good conductivity of the printed current collector. In order to avoid delamination of the current collector after printing, the content of microfibrillated cellulose MFC is higher than 1% weight in the mixture of particles. However, it has been found that a content of microfibrillated cellulose MFC lower than 3% weight in the mixture of particles allows to keep good electrical properties for the current collector.

Figure 14:
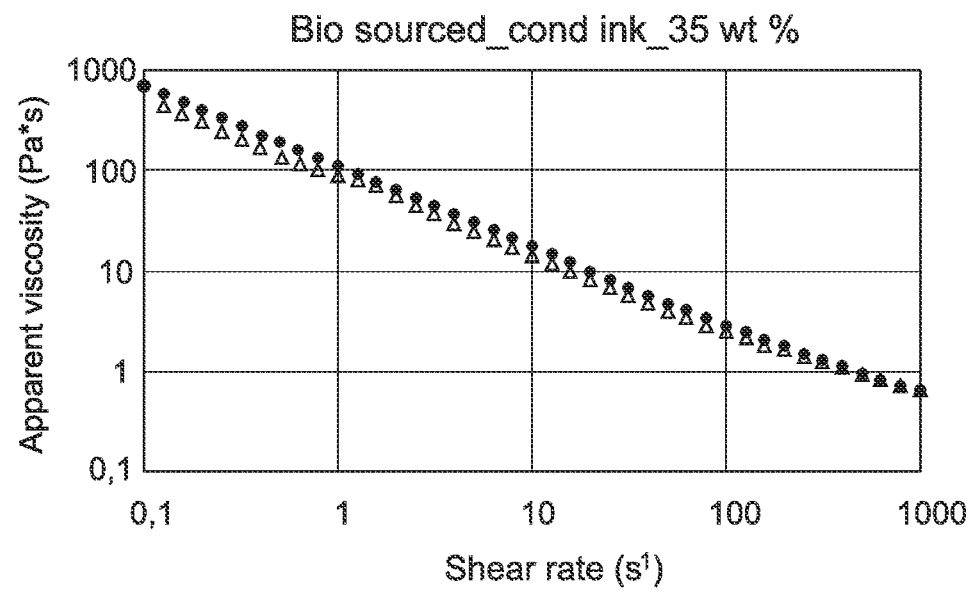
FIG. 14 is a graphic which represents the rheological shear flow behavior of a formulated bio-sourced conductive ink used to manufacture the current collector according the second aspect of the invention.

FIG. 14 shows the change in apparent viscosity (in pascal*second (Pa*s)) as a function of the shearing rate (in seconds −1, s−1) for a current collector ink having the formulation above mentioned. The curve with the full circles reflect the behavior of the ink starting from resting state and the curve with empty triangles represents the behavior of the ink starting after shearing. FIG. 14 shows limited hysteresis cycle between the two curves which demonstrates the binding effect of microfibrillated cellulose MFC and the dispersing effect of carboxymethil cellulose CMC. Based on this graph, it can be concluded that the ink obtained has a viscosity at a shear rate of 1 s−1 of 89 Pa*s and 0.65 Pa*s at a shear rate of 1000 s−1. An ink having this rheological characteristic may be easily deposited on a substrate by a printing technique such as screen printing technique.

Example 2: Printing of Conductive Layer on the Inner Side of the Outer Cover (Packaging for the Battery)

A bio-sourced conductive layer acting as a current collector has been printed on the inner side of the packaging and characterized according to the following strategy:
a. A screen printing process has been used for the deposition of the ink (reference can be made to the patent US2160126554 for the technical details of the screen printing process).
b. An ink having the same formulation as in example 1 has been prepared. 5 g of said ink has been deposed on the screen, than by adjusting the pressure and the speed applied on the squeegee, the ink was transferred onto the pre-treated inner layer of the packaging.
c. The screen printing machine used for this test is a VS1520A purchased by Aurel®. Once the electrode printed, a drying process at 60° C. under vacuum is performed.

Afterwards a soft calendering process at a pressure load of 500 kg/cm² is applied in order to reduce the porosity and increase the electrical conductivity of the current collector.

Figure 15:
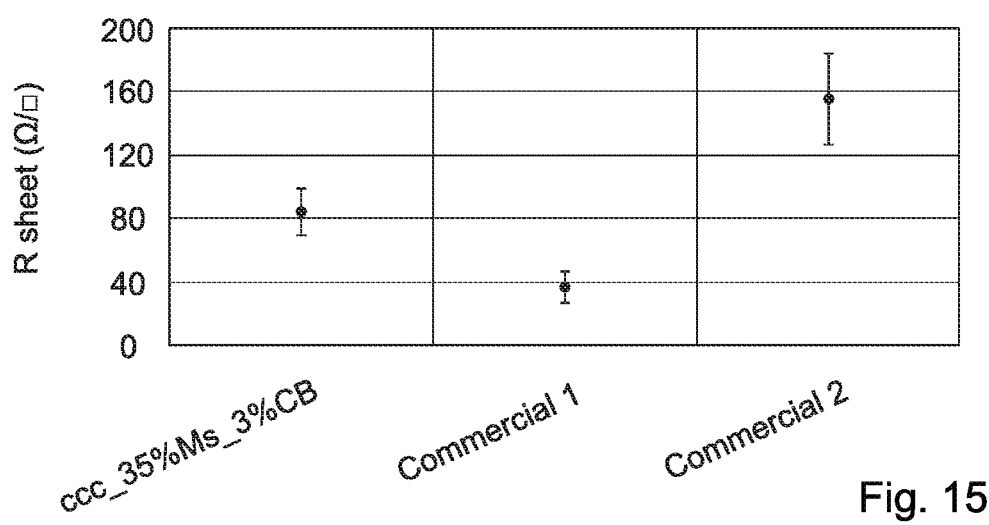
FIG. 15 is a graphic which represents the sheet resistance of the biosourced conductive inks compared with commercial inks.

The thickness of the layers is measured by a profiler P-10 sold by Tencor® and the electrical conductivity is measured by a laboratory in-made four probes instrument. FIG. 15 shows the measured sheet resistance of the printed ink obtained as explained above compared with commercial inks ("Commercial 1" and "Commercial 2"). It shows that the ink proposed is competitive with the existing inks nowadays in the market.

Figure 16:
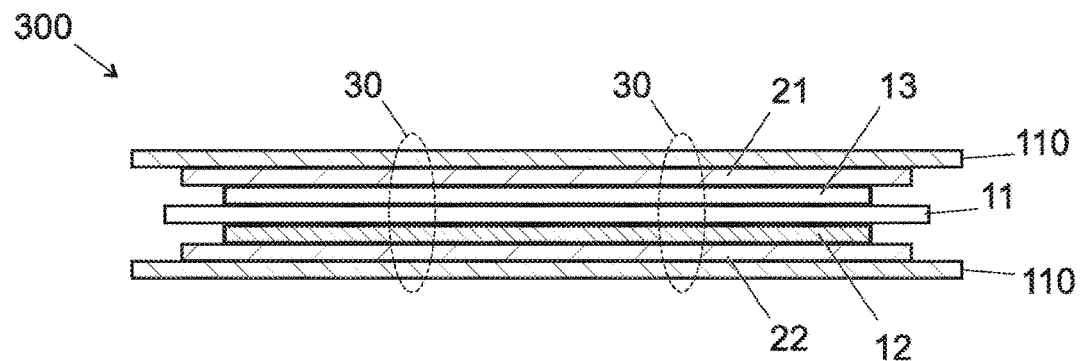
FIGS. 16 and 17 represent schematically a ion-lithium battery of the prior art according respectively to a so called "stack layout" and "coplanar layout".
Figure 17:
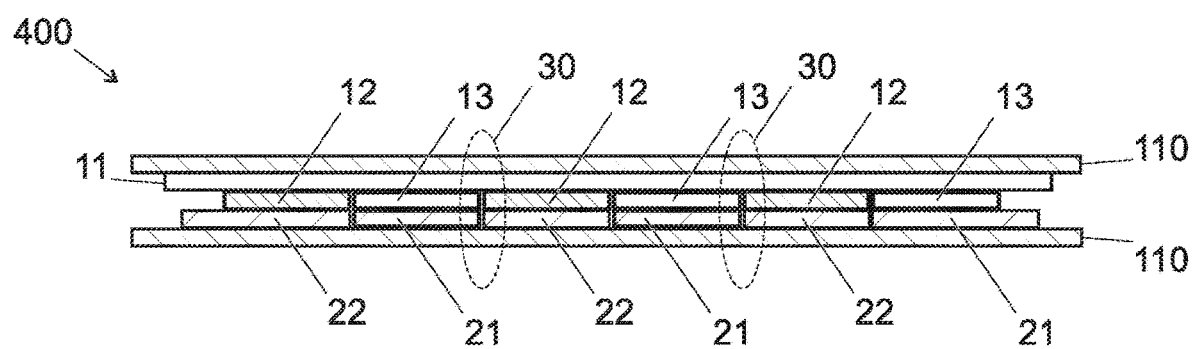

Table 1 compares the areal energy density of a battery composed by three cells assembled according to three layouts: a stacking arrangement according to the principle shown in FIG. 16, a planar arrangement according to the principle shown in FIG. 17 and front/back arrangement as shown in FIG. 10. and previously described.

In FIG. 16, is schematically shown the lithium-ion battery 300 used in the comparison test of Table 1, according to a known stacking arrangement in which continuous flexible layers are superposed in the following order, to form a band as a sandwich with all layers extending along almost the whole length of the banc: a continuous first outer cover 110 is covered by a continuous second current collector 22, the second current collector 22 is covered by a continuous positive electrode 12, the positive electrode 12 is covered by a continuous separator 11 forming a flat central band, the separator 11 is covered by a continuous negative electrode 13, the negative electrode 13 is covered by a continuous first current collector 21 and the first current collector 21 is covered by a continuous second outer cover 110.

In FIG. 17, is schematically shown the lithium-ion battery 400 used in the comparison test of Table 1, according to a known planar arrangement in which continuous and discontinuous flexible layers are superposed in the following order, to form a band as a sandwich: a continuous first outer cover 110 is covered by a discontinuous layer of current collector defining in line along the longitudinal direction of the band six portions forming alternatively a second current collector 22 and a first current collector 21, the current collector layer is covered by a discontinuous layer of electrodes defining in line along the longitudinal direction of the band six portions forming alternatively a positive electrode 12 and a negative electrode 13 (where each electrode faces and contacts a corresponding unique current collector 21 or 33), the layer of electrodes is covered by a continuous separator 11 and the separator 11 is covered by a continuous second outer cover 110.

In the batteries 300 and 400, the layers 110, 12, 13, 21, 22 have been manufactured with the same chemical composition as in the battery 200, by means of the same or equivalent manufacturing methods. The calculations have been made after folding the lithium-ion battery 300 and 400 around the two folding zones 30 so as to form three superposed folds corresponding to three superposed cells.

TABLE 1

Comparison of areal energy density (A.E.D.) between three different assembling approaches

| | Capacity mAh | A.E.D. cell mWh/cm² | Surface cell cm² | Surface battery cm² | A.E.D. battery mWh/cm² |
|---|---|---|---|---|---|
| Stack | 30 | 2.9 | 34 | 102 | 0.97 |
| Front/back | 30 | 2.9 | 34 | 108 | 0.92 |
| Planar | 30 | 2.9 | 34 | 217 | 0.46 |

The results show that the front/back assembling approach proposed in the present disclosure (as shown in FIG. 10) enables higher energy density compared with the planar layout (see FIG. 17), but that the stacking layout (see FIG. 16) ensures the highest energy density. However, in case of a stacking layout (see FIG. 16), the high bending radius at the folding zones 30 might lead to a delamination of the electrodes 12 and 12. For this reason, the assembling approach proposed in the present disclosure according to the front/back arrangement is the best solution because no electrode material are printed on the folding zones 30 (see FIG. 10) but only the carbon based current collectors 21 and 22 which are not affected by delamination. Also, the folding arrangement of the assembling of cells presented in the present disclosure enables the increment of the energy density delivered by the battery 200 without reducing the areal energy density.

LIST OF REFERENCE SIGNS

X-X' Longitudinal direction
Y-Y' Transversal direction
10 Central part
11 Separator
11a First side
11b Second side
11c First end
11d Second end
12 Positive electrode
13 Negative electrode
21 Current collector
22 Current collector
30 Folding zone
32 Positive electrode separation line
33 Negative electrode separation line
40 Cell
40a-c Cell
100 Assembling of cells
100' Assembling of cells
110 Outer cover
112 Folding line
114 Flap
116 flap
118 Internal space
119 opening
121 Electric connector
1211 External portion
122 Electric connector
1221 External portion
200 Lithium-ion battery (front/back arrangement)
300 Lithium-ion battery (stacking arrangement)
400 Lithium-ion battery (planar arrangement)

What is claimed is:

1. A foldable flexible assembling of cells for a lithium-ion battery comprising:
    a separator formed by a central band containing an electrolyte and defining, when in flat configuration, a longitudinal direction (X, X') between a first end and a second end,
    a series of n negative electrodes located on a first side of the separator and which are disposed along said longitudinal direction, each negative electrode of a pair of adjacent electrodes being physically separated from the other negative electrode of said pair of adjacent electrodes along a negative electrode separation line orthogonal to said longitudinal direction, with n being an integer equal to or larger than two,
    a series of n positive electrodes located on a second side of the separator and which are disposed in a longitudinal direction, each positive electrode of a pair of adjacent electrodes being physically separated from the other positive electrode of said pair of adjacent electrodes along a positive electrode separation line orthogonal to said longitudinal direction,
        wherein each negative electrode corresponds to an opposite positive electrode facing said negative electrode on the second side of the separator,
        wherein each negative electrode located on the first side of a portion of the separator and the corresponding positive electrode located on the second side of the same portion of the separator form an individual cell,
        wherein each said positive electrode separation line corresponds to an opposite negative electrode separation line located at a same position along the separator, on an opposite side of the separator, each said positive electrode separation line forming with said corresponding opposite negative electrode separation line a folding zone between two adjacent individual cells,
    a first current collector comprising a layer, only an inner side of the first current collector covering continuously said series of negative electrodes so as to ensure electrical connection between all said negative electrodes, and
    a second current collector comprising a layer, only an inner side of the second current collector covering continuously said series of positive electrodes so as to ensure electrical connection between all said positive electrodes.

2. An assembling of cells according to claim 1, wherein n is an odd integer.

3. An assembling of cells according to claim 1, wherein said series of n negative electrodes are disposed in parallel configuration along said longitudinal direction (X. X') and wherein said series of n positive electrodes are disposed in parallel configuration along said longitudinal direction (X. X').

4. An assembling of cells according to claim 1, wherein at least one of said first current collector and said second current collector comprises an end portion extending beyond said series of negative or positive electrodes.

5. An assembling of cells according to claim 1, wherein, when said assembling of cells is in flat configuration, said folding zone extends along said longitudinal direction (X. X') with a distance ranging between 25% to 100% of the width of said cell measured along said longitudinal direction (X. X').

6. An assembling of cells according to claim 1, wherein the layer forming said first and second current collectors is a bio-sourced conductive layer and comprises:
    at least two conductive materials among the following: carbon based materials and water-soluble or water-dispersible conductive polymers, said conductive materials including at least one carbon based material and being in a total amount in the range from about 70 to 99.5 per weight % relative to the total weight of the current collector,
    at least one binder comprising a lignocellulosic material selected from the group consisting of cellulose fibres, refined cellulose fibres, cellulose microfibrils or microfibrillated cellulose (MFC), cellulose nanofibrils and lignin, in an amount in the range from about 0.5 to 30 weight % relative to the total weight of the current collector.

7. An assembling of cells according to claim 6, wherein said at least two conductive materials are carbon based materials.

8. An assembling of cells according to claim 7, wherein said at least two conductive materials comprises at least carbon black and graphite powder.

9. An assembling of cells according to claim 7, wherein said at least two conductive materials comprise carbon black.

10. An assembling of cells according to claim 9, wherein said carbon black is present according to a total amount in the range from about 2.5 to 5 per weight % relative to the total weight of the mixture of solid particles.

11. An assembling of cells according to claim 6, wherein said at least two conductive materials comprise graphite powder.

12. An assembling of cells according to claim 11, wherein said graphite powder is present according to a total amount higher than 90 per weight % relative to the total weight of the current collector.

13. An assembling of cells according to claim 6, wherein said at least one binder comprises a lignocellulosic material present according to a total amount ranging from 1 to 3 per weight % relative to the total weight of the current collector.

14. An assembling of cells according to claim 6, further comprising an anti-flocculant agent comprising a lignocellulosic material present according to a total amount ranging from 0.5 to 5 per weight % relative to the total weight of the current collector.

15. An assembling of cells according to claim 14, wherein said anti-flocculant agent is carboxymethyl cellulose and said binder is microfibrillated cellulose (MFC).

16. A lithium-ion battery comprising an assembling of cells according to claim 1, said assembling of cells being folded like an accordion around at least one folding line formed by a pair of corresponding positive electrode separation line and negative electrode separation line, wherein each fold contains at least one individual cell, wherein it further comprises a flexible outer cover defining an internal space containing said accordion-like folded assembling of cells.

17. A lithium-ion battery according to claim 16, wherein each fold contains a single individual cell.

18. A lithium-ion battery according to claim 16, wherein said flexible outer cover comprises two adjacent flaps foldable with respect to each other to form two opposite outer walls attached to each other along their respective edge, thereby defining said internal space for said assembling of cells.

19. A lithium-ion battery according to claim 18, wherein said assembling of cells contained in said internal space is compressed in the direction orthogonal to the two opposite outer walls of the outer cover.

20. A lithium-ion battery according to claim 18, wherein said internal space is hermetically sealed.

21. A lithium-ion battery according to claim 16, wherein the inner face of at least one flap of said flexible outer cover is covered by an inner portion of an electric connector which is electrically connected with either said first current collector or said second current collector of the assembling of cells.

22. A lithium-ion battery according to claim 21, wherein said electric connector comprises an external portion extending beyond the limit of said internal space in order to form a connection tab.

23. A lithium-ion battery according to claim 16, wherein the thickness of said lithium-ion battery is comprised between 100 micrometers and 10 millimeters.

* * * * *